US012598663B2

(12) United States Patent
Natarajan et al.

(10) Patent No.: US 12,598,663 B2
(45) Date of Patent: Apr. 7, 2026

(54) METHOD, APPARATUS AND COMPUTER PROGRAM FOR MULTI-NETWORK REGISTRATION AND DOWNLINK DATA NOTIFICATION HANDLING

(71) Applicant: Nokia Technologies Oy, Espoo (FI)

(72) Inventors: Rajesh Babu Natarajan, Bangalore (IN); Srinivas Bandi, Bangalore (IN); Betsy Covell, Chicago, IL (US); Alessio Casati, West Molesey (GB)

(73) Assignee: NOKIA TECHNOLOGIES OY, Espoo (FI)

( * ) Notice: Subject to any disclaimer, the term of this patent is extended or adjusted under 35 U.S.C. 154(b) by 518 days.

(21) Appl. No.: 18/040,446

(22) PCT Filed: Jul. 12, 2021

(86) PCT No.: PCT/EP2021/069314
§ 371 (c)(1),
(2) Date: Feb. 3, 2023

(87) PCT Pub. No.: WO2022/028815
PCT Pub. Date: Feb. 10, 2022

(65) Prior Publication Data
US 2023/0292386 A1 Sep. 14, 2023

(30) Foreign Application Priority Data
Aug. 6, 2020 (IN) .............................. 202041033767

(51) Int. Cl.
*H04W 76/15* (2018.01)
*H04W 68/00* (2009.01)

(52) U.S. Cl.
CPC ......... *H04W 76/15* (2018.02); *H04W 68/005* (2013.01)

(58) Field of Classification Search
CPC ... H04W 76/15; H04W 68/005; H04W 60/00; H04W 68/00
See application file for complete search history.

(56) References Cited

U.S. PATENT DOCUMENTS

| | | | | |
|---|---|---|---|---|
| 2020/0305118 A1* | 9/2020 | Ryu | ...................... | H04W 76/10 |
| 2021/0153006 A1* | 5/2021 | Kim | ....................... | H04L 69/28 |
| 2021/0168901 A1* | 6/2021 | Kim | ...................... | H04W 48/16 |
| 2022/0240213 A1* | 7/2022 | Ly | ........................ | H04W 48/18 |
| 2022/0303934 A1* | 9/2022 | Ianev | .................... | H04W 60/06 |
| 2023/0045765 A1* | 2/2023 | Youn | ................... | H04W 60/005 |
| 2023/0106205 A1* | 4/2023 | Zhang | .................. | H04W 68/02 |
| | | | | 455/435.1 |

OTHER PUBLICATIONS

3GPP TR 23.761 V0.4.0 (Jun. 2020) (Year: 2020).*

* cited by examiner

*Primary Examiner* — Noel R Beharry
*Assistant Examiner* — Angelie T Ngo
(74) *Attorney, Agent, or Firm* — Carter, DeLuca & Farrell LLP

(57) ABSTRACT

There is provided an apparatus, said apparatus comprising means for at a user equipment registered with a first network and a second network, accessing the second network and receiving at the user equipment from the second network a downlink data notification associated with the first network.

1 Claim, 13 Drawing Sheets

Figure 4:
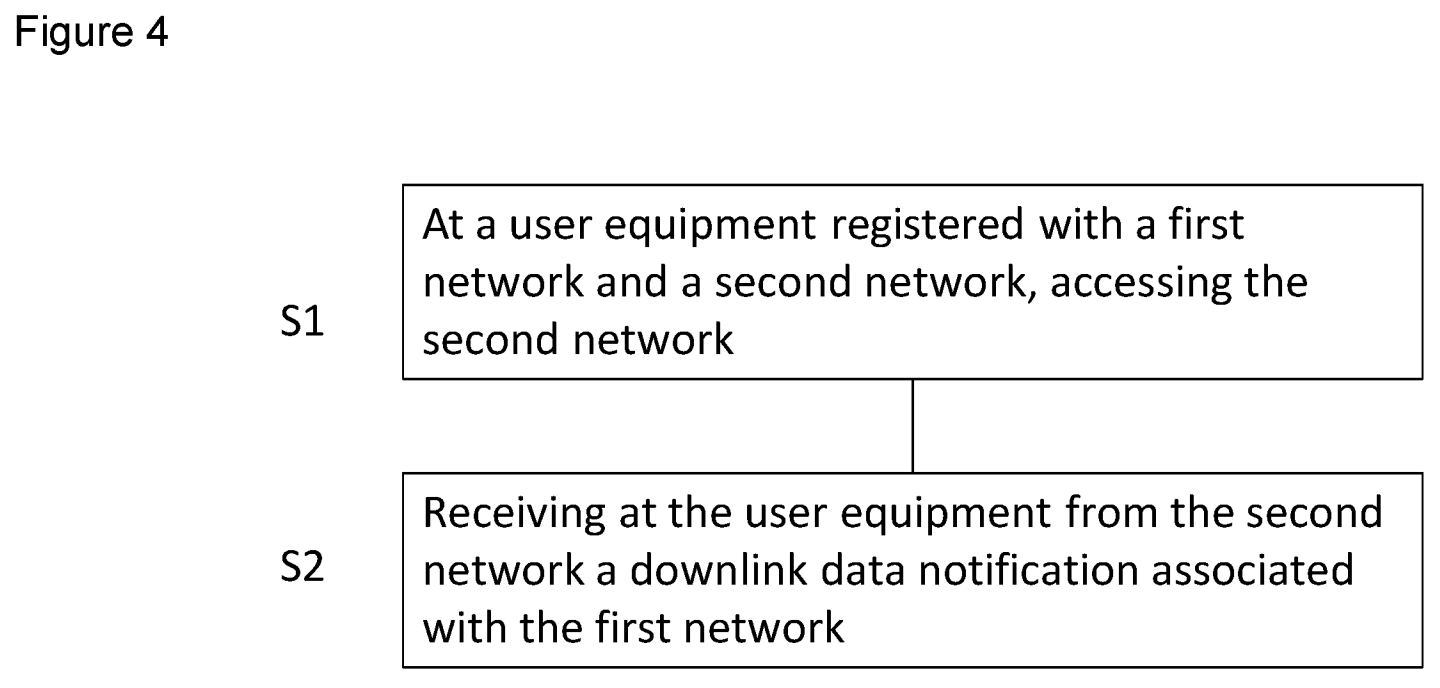

At a user equipment registered with a first network and a second network, accessing the second network

S2

Receiving at the user equipment from the second network a downlink data notification associated with the first network

Figure 5:
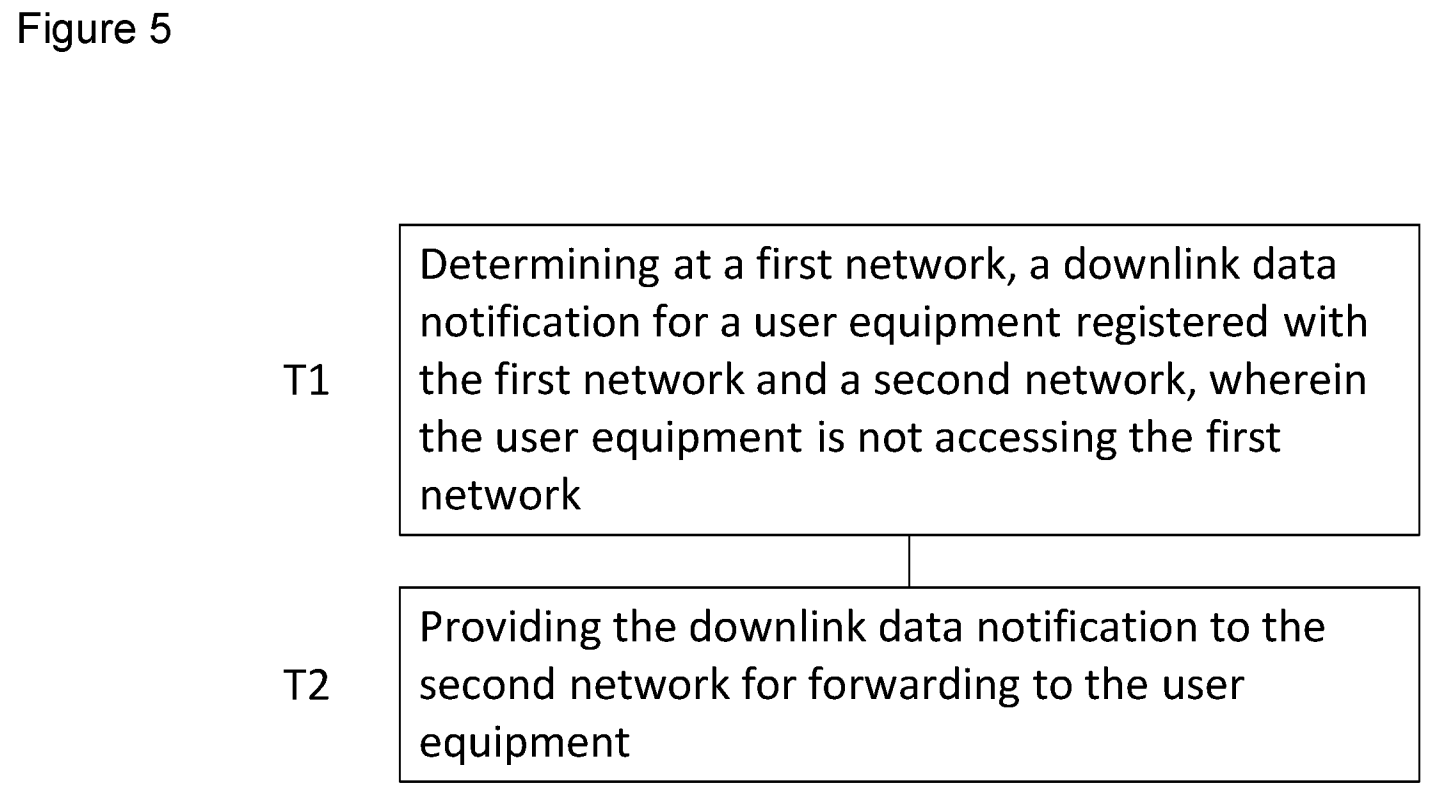

Determining at a first network, a downlink data notification for a user equipment registered with the first network and a second network, wherein the user equipment is not accessing the first network

T2

Providing the downlink data notification to the second network for forwarding to the user equipment

Figure 6:
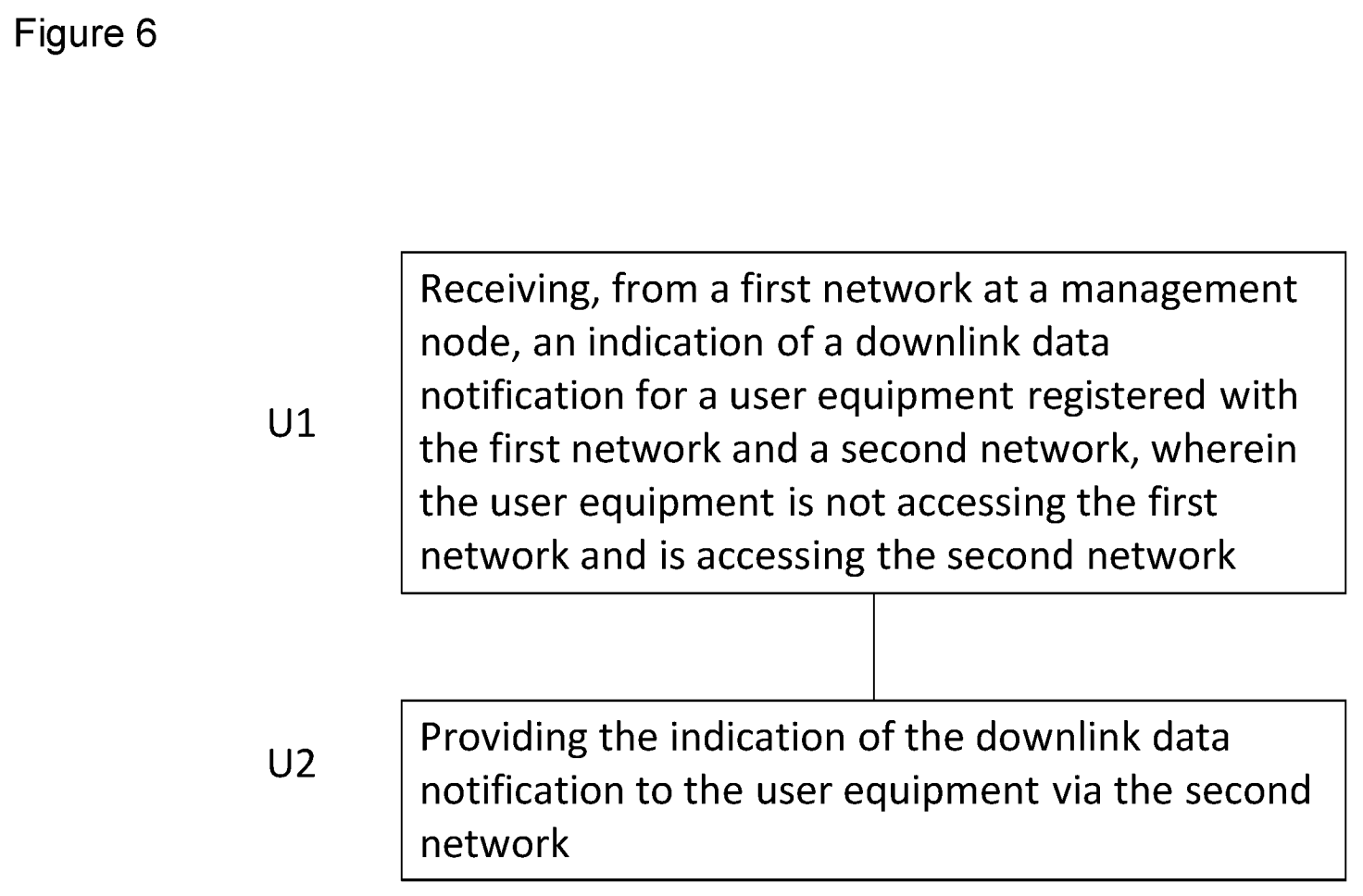

Receiving, from a first network at a management node, an indication of a downlink data notification for a user equipment registered with the first network and a second network, wherein the user equipment is not accessing the first network and is accessing the second network

U2

Providing the indication of the downlink data notification to the user equipment via the second network R1 — Receiving an indication of a downlink data notification from a first network at a second network R2 — Providing the indication of the downlink data notification to a user equipment, wherein the user equipment is not accessing the first network and is accessing the second network

METHOD, APPARATUS AND COMPUTER PROGRAM FOR MULTI-NETWORK REGISTRATION AND DOWNLINK DATA NOTIFICATION HANDLING

RELATED APPLICATION

This application was originally filed as PCT Application No. PCT/EP2021/069314, filed on Jul. 12, 2021, which claims the benefit of priority of Indian application Ser. No. 20/204,1033767, filed on Aug. 6, 2020, both of which are incorporated herein by reference in their entirety.

FIELD

The present application relates to a method, apparatus, and computer program and in particular but not exclusively to paging optimization for a UE with multiple registration capability.

BACKGROUND

A communication system can be seen as a facility that enables communication sessions between two or more entities such as user terminals, base stations and/or other nodes by providing carriers between the various entities involved in the communications path. A communication system can be provided for example by means of a communication network and one or more compatible communication devices (also referred to as station or user equipment) and/or application servers. The communication sessions may comprise, for example, communication of data for carrying communications such as voice, video, electronic mail (email), text message, multimedia, content data, time-sensitive network (TSN) flows and/or data in an industrial application such as critical system messages between an actuator and a controller, critical sensor data (such as measurements, video feed etc.) towards a control system and so on. Non-limiting examples of services provided comprise two-way or multi-way calls, data communication or multimedia services and access to a data network system, such as the Internet.

In a wireless communication system at least a part of a communication session, for example, between at least two stations or between at least one station and at least one application server (e.g. for video), occurs over a wireless link. Examples of wireless systems comprise public land mobile networks (PLMN) operating based on 3GPP radio standards such as E-UTRA, New Radio, satellite based communication systems and different wireless local networks, for example wireless local area networks (WLAN). The wireless systems can typically be divided into cells, and are therefore often referred to as cellular systems.

A user can access the communication system by means of an appropriate communication device or terminal. A communication device of a user may be referred to as user equipment (UE) or user device. A communication device is provided with an appropriate signal receiving and transmitting apparatus for enabling communications, for example enabling access to a communication network or communications directly with other users. The communication device may access one or more carriers provided by the network, for example a base station of a cell, and transmit and/or receive communications on the one or more carriers. In carrier aggregation (CA) two or more carriers are combined into one channel. In dual connectivity (DC), two carriers from different sites are combined, that is a user equipment may be dual (or multi) connected to two (or more) sites.

The communication system and associated devices typically operate in accordance with a given standard or specification which sets out what the various entities associated with the system are permitted to do and how that should be achieved. Communication protocols and/or parameters which shall be used for the connection are also typically defined. One example of a communications system is UTRAN (3G radio). Other examples of communication systems are the long-term evolution (LTE) of the Universal Mobile Telecommunications System (UMTS) based on the E-UTRAN radio-access technology, and so-called 5G system (5GS) including the 5G or next generation core (NGC) and the 5G Access network based on the New Radio (NR) radio-access technology. 5GS including NR are being standardized by the 3rd Generation Partnership Project (3GPP).

SUMMARY

In a first aspect there is provided an apparatus, said apparatus comprising means for at a user equipment registered with a first network and a second network, accessing the second network and receiving at the user equipment from the second network a downlink data notification associated with the first network.

The user equipment may be in an inactive state or mobile initiated connection only mode for the first network.

The apparatus may comprise means for receiving the downlink data notification at the user equipment in a configuration update request from the second network when the user equipment is in a connected mode or in a paging message when the user equipment is in idle mode.

The apparatus may comprise means for providing a response to the configuration update request from the user equipment to the second network with either an indication that the user equipment is moving to the first network, the indication comprising buffer time details, or a rejection of the configuration update request.

The apparatus may comprise means for providing an indication from the user equipment to the second network that the user equipment is moving to an inactive state and performing a service request procedure with the first network.

The apparatus may comprise means for providing an indication to the second network that the user equipment is in a mobile initiated communication only, MICO, mode in a registration update procedure.

The first network may be a first visited network. The second network may be a second visited network.

The user equipment may be registered with more than two networks.

The apparatus may comprise means for providing an indication that the user equipment supports registration with more than one network to the first network and the second network during a registration procedure with the respective network.

The apparatus may comprise means for receiving first network information along with the downlink data notification.

The user equipment may have a first universal subscriber identity module, USIM, registered with the first network and a second USIM registered with the second network, and comprise means for providing an identifier of the second USIM to the first network during registration of the first USIM and providing an identifier of the first USIM to the second network during registration of the second USIM.

The user equipment may have a plurality of second USIMs, each USIM registered with one of a plurality of second networks and comprising means for providing an indication to the first network of which of the plurality of second networks is an active network.

In a second aspect there is provided an apparatus comprising means for determining at a first network, a downlink data notification for a user equipment registered with the first network and a second network, wherein the user equipment is not accessing the first network and providing an indication of the downlink data notification from the first network to the second network for forwarding to the user equipment.

The user equipment may be in an inactive state or mobile initiated communication only, MICO, mode for the first network.

The first network may be a first visited network and the second network may be a second visited network and the apparatus may comprise means for providing the indication of the downlink data notification to the second network via a home network associated with the user equipment.

The apparatus may comprise means for receiving a response to the indication of the downlink data notification from the second network via the home network associated with the user equipment.

The apparatus may comprise means for providing the response to a session management function.

The user equipment may have a first universal subscriber identity module, USIM, registered with the first network and a second USIM registered with the second network, and the apparatus may comprise means for receiving an identifier of the second USIM at the first network from the user equipment during registration of the first USIM at the first network.

The apparatus may comprise means for receiving the indication of the downlink data notification from a management node of the first network or the second network.

The user equipment may be registered with a plurality of second networks and the apparatus may comprise means for, determining which of the plurality of second networks is a current active network to forward the indication of the downlink data notification for the user equipment.

The apparatus may comprise means for determining a management node of the second network or active network based on the identifier of the second USIM.

The user equipment may have more than two USIMs, each USIM registered with one of a plurality of second networks, and the apparatus may comprise means for receiving from the user equipment an indication of which of the plurality of second networks is the active network and determining the management node based on the indication and the identifier of the USIM of the active network.

The apparatus may comprise means for providing the indication of the downlink data notification for the user equipment to the management node of the active network.

The apparatus may comprise means for receiving a response to the indication of the downlink data notification from the management node of the active network and providing the response to the management node of the first network.

The apparatus may comprise means for providing an identifier of the first USIM and an identifier of the second USIM with the indication of the downlink data notification to the active network.

In a third aspect there is provided an apparatus comprising means for receiving, from a first network at a management node, an indication of a downlink data notification for a user equipment registered with the first network and a second network, wherein the user equipment is not accessing the first network and is accessing the second network and providing the indication of downlink data notification to the user equipment via the second network.

The apparatus may comprise a management node at the second network. The user equipment may have a first universal subscriber identity module, USIM, registered with the first network and a second USIM registered with the second network. The apparatus may comprise means for receiving an identifier of the first USIM at the second network from the user equipment during registration of the second USIM at the second network.

The indication of the downlink notification may comprise at least one of first network information, an identifier of the first USIM and an identifier of the second USIM.

The apparatus may comprise means for validating the received identifiers and indicating the downlink data notification for the first USIM to the user equipment.

The first network may comprise a first visited network, the second network may comprise at least one second visited network and the apparatus may comprise a management node at a home network.

When the user equipment is active in more than one second network, the apparatus may comprise means for determining the second network via which to send the indication of the downlink data notification based on a preference received from the user equipment or the most recently updated second network.

The apparatus may comprise means for receiving a response to the indication of the downlink data from the user equipment via the second network.

The response may comprise an indication of failure and the apparatus may comprise means for, if the user equipment is active in more than one second network determining a further second network via which to provide the indication of the downlink data notification to the user equipment.

The apparatus may comprise means for providing the response to the first network.

In a fourth aspect there is provided an apparatus comprising means for receiving an indication of a downlink data notification from a first network at a second network and providing the indication of the downlink data notification to a user equipment, wherein the user equipment is not accessing the first network and is accessing the second network.

When the user equipment has a first USIM registered with the first network and a second USIM registered with the second network, the apparatus may comprise means for receiving the indication of the downlink data notification from a management node of the second network.

The apparatus may comprise means for providing a response to the indication of downlink data notification to the management node of the second network.

The apparatus may comprise means for receiving an identifier of the first USIM and an identifier of the second USIM with the indication of the downlink data notification from the first network.

When the first network and the second network comprise visited networks, the apparatus may comprise means for receiving the indication of the downlink data notification from a home network associated with the user equipment.

The apparatus may comprise means for providing a response to the indication of downlink data notification from the second network to the first network via the home network associated with the user equipment.

In a fifth aspect there is provided a method comprising at a user equipment registered with a first network and a second network, accessing the second network and receiving at the user equipment from the second network a downlink data notification associated with the first network.

The user equipment may be in an inactive state or mobile initiated connection only mode for the first network.

The method may comprise receiving the downlink data notification at the user equipment in a configuration update request from the second network when the user equipment is in a connected mode or in a paging message when the user equipment is in idle mode.

The method may comprise providing a response to the configuration update request from the user equipment to the second network with either an indication that the user equipment is moving to the first network, the indication comprising buffer time details, or a rejection of the configuration update request.

The method may comprise providing an indication from the user equipment to the second network that the user equipment is moving to an inactive state and performing a service request procedure with the first network.

The method may comprise providing an indication to the second network that the user equipment is in a mobile initiated communication only, MICO, mode in a registration update procedure.

The first network may be a first visited network. The second network may be a second visited network.

The user equipment may be registered with more than two networks.

The method may comprise providing an indication that the user equipment supports registration with more than one network to the first network and the second network during a registration procedure with the respective network.

The method may comprise receiving first network information along with the downlink data notification.

The user equipment may have a first universal subscriber identity module, USIM, registered with the first network and a second USIM registered with the second network, and the method may comprise providing an identifier of the second USIM to the first network during registration of the first USIM and providing an identifier of the first USIM to the second network during registration of the second USIM.

The user equipment may have a plurality of second USIMs, each USIM registered with one of a plurality of second networks and the method may comprise providing an indication to the first network of which of the plurality of second networks is an active network.

In a sixth aspect there is provided a method comprising determining at a first network, a downlink data notification for a user equipment registered with the first network and a second network, wherein the user equipment is not accessing the first network and providing an indication of the downlink data notification from the first network to the second network for forwarding to the user equipment.

The user equipment may be in an inactive state or mobile initiated communication only, MICO, mode for the first network.

The first network may be a first visited network and the second network may be a second visited network and the method may comprise providing the indication of the downlink data notification to the second network via a home network associated with the user equipment.

The method may comprise receiving a response to the indication of the downlink data notification from the second network via the home network associated with the user equipment.

The method may comprise providing the response to a session management function.

The user equipment may have a first universal subscriber identity module, USIM, registered with the first network and a second USIM registered with the second network, and the method may comprise receiving an identifier of the second USIM at the first network from the user equipment during registration of the first USIM at the first network.

The method may comprise receiving the indication of the downlink data notification from a management node of the first network or the second network.

The user equipment may be registered with a plurality of second networks and the method may comprise determining which of the plurality of second networks is a current active network to forward the indication of the downlink data notification for the user equipment.

The method may comprise determining a management node of the second network or active network based on the identifier of the second USIM.

The user equipment may have more than two USIMs, each USIM registered with one of a plurality of second networks, and the method may comprise receiving from the user equipment an indication of which of the plurality of second networks is the active network and determining the management node based on the indication and the identifier of the USIM of the active network.

The method may comprise providing the indication of the downlink data notification for the user equipment to the management node of the active network.

The method may comprise receiving a response to the indication of the downlink data notification from the management node of the active network and providing the response to the management node of the first network.

The method may comprise providing an identifier of the first USIM and an identifier of the second USIM with the indication of the downlink data notification to the active network.

In a seventh aspect there is provided a method comprising receiving, from a first network at a management node, an indication of a downlink data notification for a user equipment registered with the first network and a second network, wherein the user equipment is not accessing the first network and is accessing the second network and providing the indication of downlink data notification to the user equipment via the second network.

The method may be performed at a management node at the second network. The user equipment may have a first universal subscriber identity module, USIM, registered with the first network and a second USIM registered with the second network. The method may comprise receiving an identifier of the first USIM at the second network from the user equipment during registration of the second USIM at the second network.

The indication of the downlink notification may comprise at least one of first network information, an identifier of the first USIM and an identifier of the second USIM.

The method may comprise validating the received identifiers and indicating the downlink data notification for the first USIM to the user equipment.

The first network may comprise a first visited network, the second network may comprise at least one second visited network and the method may be performed at a management node at a home network.

When the user equipment is active in more than one second network, the method may comprise determining the second network via which to send the indication of the downlink data notification based on a preference received from the user equipment or the most recently updated second network.

The method may comprise receiving a response to the indication of the downlink data from the user equipment via the second network.

The response may comprise an indication of failure and the method may comprise, if the user equipment is active in more than one second network determining a further second network via which to provide the indication of the downlink data notification to the user equipment.

The method may comprise providing the response to the first network.

In an eighth aspect there is provided a method comprising receiving an indication of a downlink data notification from a first network at a second network and providing the indication of the downlink data notification to a user equipment, wherein the user equipment is not accessing the first network and is accessing the second network.

When the user equipment has a first USIM registered with the first network and a second USIM registered with the second network, the method may comprise receiving the indication of the downlink data notification from a management node of the second network.

The method may comprise providing a response to the indication of downlink data notification to the management node of the second network.

The method may comprise receiving an identifier of the first USIM and an identifier of the second USIM with the indication of the downlink data notification from the first network.

When the first network and the second network comprise visited networks, the method may comprise receiving the indication of the downlink data notification from a home network associated with the user equipment.

The method may comprise providing a response to the indication of downlink data notification from the second network to the first network via the home network associated with the user equipment.

In a ninth aspect there is provided an apparatus comprising: at least one processor and at least one memory including a computer program code, the at least one memory and computer program code configured to, with the at least one processor, cause the apparatus at least to: at a user equipment registered with a first network and a second network, access the second network and receive at the user equipment from the second network a downlink data notification associated with the first network.

The user equipment may be in an inactive state or mobile initiated connection only mode for the first network.

The apparatus may be configured to receive the downlink data notification at the user equipment in a configuration update request from the second network when the user equipment is in a connected mode or in a paging message when the user equipment is in idle mode.

The apparatus may be configured to provide a response to the configuration update request from the user equipment to the second network with either an indication that the user equipment is moving to the first network, the indication comprising buffer time details, or a rejection of the configuration update request.

The apparatus may be configured to provide an indication from the user equipment to the second network that the user equipment is moving to an inactive state and perform a service request procedure with the first network.

The apparatus may be configured to provide an indication to the second network that the user equipment is in a mobile initiated communication only, MICO, mode in a registration update procedure.

The first network may be a first visited network. The second network may be a second visited network.

The user equipment may be registered with more than two networks.

The apparatus may be configured to provide an indication that the user equipment supports registration with more than one network to the first network and the second network during a registration procedure with the respective network.

The apparatus may be configured to receive first network information along with the downlink data notification.

The user equipment may have a first universal subscriber identity module, USIM, registered with the first network and a second USIM registered with the second network, and be configured to provide an identifier of the second USIM to the first network during registration of the first USIM and provide an identifier of the first USIM to the second network during registration of the second USIM.

The user equipment may have a plurality of second USIMs, each USIM registered with one of a plurality of second networks and be configured to provide an indication to the first network of which of the plurality of second networks is an active network.

In a tenth aspect there is provided an apparatus comprising: at least one processor and at least one memory including a computer program code, the at least one memory and computer program code configured to, with the at least one processor, cause the apparatus at least to: determine at a first network, a downlink data notification for a user equipment registered with the first network and a second network, wherein the user equipment is not accessing the first network and provide an indication of the downlink data notification from the first network to the second network for forwarding to the user equipment.

The user equipment may be in an inactive state or mobile initiated communication only, MICO, mode for the first network.

The first network may be a first visited network and the second network may be a second visited network and the apparatus may be configured to provide the indication of the downlink data notification to the second network via a home network associated with the user equipment.

The apparatus may be configured to receive a response to the indication of the downlink data notification from the second network via the home network associated with the user equipment.

The apparatus may be configured to provide the response to a session management function.

The user equipment may have a first universal subscriber identity module, USIM, registered with the first network and a second USIM registered with the second network, and the apparatus may be configured to receive an identifier of the second USIM at the first network from the user equipment during registration of the first USIM at the first network.

The apparatus may be configured to receive the indication of the downlink data notification from a management node of the first network or the second network.

The user equipment may be registered with a plurality of second networks and the apparatus may be configured to determine which of the plurality of second networks is a current active network to forward the indication of the downlink data notification for the user equipment.

The apparatus may be configured to determine a management node of the second network or active network based on the identifier of the second USIM.

The user equipment may have more than two USIMs, each USIM registered with one of a plurality of second networks, and the apparatus may be configured to receive from the user equipment an indication of which of the plurality of second networks is the active network and determine the management node based on the indication and the identifier of the USIM of the active network.

The apparatus may be configured to provide the indication of the downlink data notification for the user equipment to the management node of the active network.

The apparatus may be configured to receive a response to the indication of the downlink data notification from the management node of the active network and providing the response to the management node of the first network.

The apparatus may be configured to provide an identifier of the first USIM and an identifier of the second USIM with the indication of the downlink data notification to the active network.

In an eleventh aspect there is provided an apparatus comprising: at least one processor and at least one memory including a computer program code, the at least one memory and computer program code configured to, with the at least one processor, cause the apparatus at least to receive from a first network at a management node, an indication of a downlink data notification for a user equipment registered with the first network and a second network, wherein the user equipment is not accessing the first network and is accessing the second network and provide the indication of downlink data notification to the user equipment via the second network.

The apparatus may comprise a management node at the second network. The user equipment may have a first universal subscriber identity module, USIM, registered with the first network and a second USIM registered with the second network. The apparatus may be configured to receive an identifier of the first USIM at the second network from the user equipment during registration of the second USIM at the second network.

The indication of the downlink notification may comprise at least one of first network information, an identifier of the first USIM and an identifier of the second USIM.

The apparatus may be configured to validate the received identifiers and indicate the downlink data notification for the first USIM to the user equipment.

The first network may comprise a first visited network, the second network may comprise at least one second visited network and the apparatus may comprise a management node at a home network.

When the user equipment is active in more than one second network, the apparatus may be configured to determine the second network via which to send the indication of the downlink data notification based on a preference received from the user equipment or the most recently updated second network.

The apparatus may be configured to receive a response to the indication of the downlink data from the user equipment via the second network.

The response may comprise an indication of failure and the apparatus may be configured to, if the user equipment is active in more than one second network determine a further second network via which to provide the indication of the downlink data notification to the user equipment.

The apparatus may be configured to provide the response to the first network.

In a twelfth aspect there is provided an apparatus comprising: at least one processor and at least one memory including a computer program code, the at least one memory and computer program code configured to, with the at least one processor, cause the apparatus at least to: receive an indication of a downlink data notification from a first network at a second network and provide the indication of the downlink data notification to a user equipment, wherein the user equipment is not accessing the first network and is accessing the second network.

When the user equipment has a first USIM registered with the first network and a second USIM registered with the second network, the apparatus may be configured to receive the indication of the downlink data notification from a management node of the second network.

The apparatus may be configured to provide a response to the indication of downlink data notification to the management node of the second network.

The apparatus may be configured to receive an identifier of the first USIM and an identifier of the second USIM with the indication of the downlink data notification from the first network.

When the first network and the second network comprise visited networks, the apparatus may be configured to receive the indication of the downlink data notification from a home network associated with the user equipment.

The apparatus may be configured to provide a response to the indication of downlink data notification from the second network to the first network via the home network associated with the user equipment.

In a thirteenth aspect there is provided a computer readable medium comprising program instructions for causing an apparatus to perform at least the following at a user equipment registered with a first network and a second network, accessing the second network and receiving at the user equipment from the second network a downlink data notification associated with the first network.

The user equipment may be in an inactive state or mobile initiated connection only mode for the first network.

The apparatus may be caused to perform receiving the downlink data notification at the user equipment in a configuration update request from the second network when the user equipment is in a connected mode or in a paging message when the user equipment is in idle mode.

The apparatus may be caused to perform providing a response to the configuration update request from the user equipment to the second network with either an indication that the user equipment is moving to the first network, the indication comprising buffer time details, or a rejection of the configuration update request.

The apparatus may be caused to perform providing an indication from the user equipment to the second network that the user equipment is moving to an inactive state and performing a service request procedure with the first network.

The apparatus may be caused to perform providing an indication to the second network that the user equipment is in a mobile initiated communication only, MICO, mode in a registration update procedure.

The first network may be a first visited network. The second network may be a second visited network.

The user equipment may be registered with more than two networks.

The apparatus may be caused to perform providing an indication that the user equipment supports registration with more than one network to the first network and the second network during a registration procedure with the respective network.

The apparatus may be caused to perform receiving first network information along with the downlink data notification.

The user equipment may have a first universal subscriber identity module, USIM, registered with the first network and a second USIM registered with the second network, be caused to perform providing an identifier of the second USIM to the first network during registration of the first USIM and providing an identifier of the first USIM to the second network during registration of the second USIM.

The user equipment may have a plurality of second USIMs, each USIM registered with one of a plurality of second networks and be caused to perform providing an indication to the first network of which of the plurality of second networks is an active network.

In a fourteenth aspect there is provided a computer readable medium comprising program instructions for causing an apparatus to perform at least the following determining at a first network, a downlink data notification for a user equipment registered with the first network and a second network, wherein the user equipment is not accessing the first network and providing an indication of the downlink data notification from the first network to the second network for forwarding to the user equipment.

The user equipment may be in an inactive state or mobile initiated communication only, MICO, mode for the first network.

The first network may be a first visited network and the second network may be a second visited network and the apparatus may be caused to perform providing the indication of the downlink data notification to the second network via a home network associated with the user equipment.

The apparatus may be caused to perform receiving a response to the indication of the downlink data notification from the second network via the home network associated with the user equipment.

The apparatus may be caused to perform providing the response to a session management function.

The user equipment may have a first universal subscriber identity module, USIM, registered with the first network and a second USIM registered with the second network, and the apparatus may be caused to perform receiving an identifier of the second USIM at the first network from the user equipment during registration of the first USIM at the first network.

The apparatus may be caused to perform receiving the indication of the downlink data notification from a management node of the first network or the second network.

The user equipment may be registered with a plurality of second networks and the apparatus may be caused to perform, determining which of the plurality of second networks is a current active network to forward the indication of the downlink data notification for the user equipment.

The apparatus may be caused to perform determining a management node of the second network or active network based on the identifier of the second USIM.

The user equipment may have more than two USIMs, each USIM registered with one of a plurality of second networks, and the apparatus may be caused to perform receiving from the user equipment an indication of which of the plurality of second networks is the active network and determining the management node based on the indication and the identifier of the USIM of the active network.

The apparatus may be caused to perform providing the indication of the downlink data notification for the user equipment to the management node of the active network.

The apparatus may be caused to perform receiving a response to the indication of the downlink data notification from the management node of the active network and providing the response to the management node of the first network.

The apparatus may be caused to perform providing an identifier of the first USIM and an identifier of the second USIM with the indication of the downlink data notification to the active network.

In a fifteenth aspect there is provided a computer readable medium comprising program instructions for causing an apparatus to perform at least the following receiving, from a first network at a management node, an indication of a downlink data notification for a user equipment registered with the first network and a second network, wherein the user equipment is not accessing the first network and is accessing the second network and providing the indication of downlink data notification to the user equipment via the second network.

The apparatus may comprise a management node at the second network. The user equipment may have a first universal subscriber identity module, USIM, registered with the first network and a second USIM registered with the second network. The apparatus may be caused to perform receiving an identifier of the first USIM at the second network from the user equipment during registration of the second USIM at the second network.

The indication of the downlink notification may comprise at least one of first network information, an identifier of the first USIM and an identifier of the second USIM.

The apparatus may be caused to perform validating the received identifiers and indicating the downlink data notification for the first USIM to the user equipment.

The first network may comprise a first visited network, the second network may comprise at least one second visited network and the apparatus may comprise a management node at a home network.

When the user equipment is active in more than one second network, the apparatus may be caused to perform determining the second network via which to send the indication of the downlink data notification based on a preference received from the user equipment or the most recently updated second network.

The apparatus may be caused to perform receiving a response to the indication of the downlink data from the user equipment via the second network.

The response may comprise an indication of failure and the apparatus may be caused to perform, if the user equipment is active in more than one second network determining a further second network via which to provide the indication of the downlink data notification to the user equipment.

The apparatus may be caused to perform providing the response to the first network.

In a sixteenth aspect there is provided a computer readable medium comprising program instructions for causing an apparatus to perform at least the following: receiving an indication of a downlink data notification from a first network at a second network and providing the indication of the downlink data notification to a user equipment, wherein the user equipment is not accessing the first network and is accessing the second network.

When the user equipment has a first USIM registered with the first network and a second USIM registered with the second network, the apparatus may be caused to perform receiving the indication of the downlink data notification from a management node of the second network.

The apparatus may be caused to perform providing a response to the indication of downlink data notification to the management node of the second network.

The apparatus may be caused to perform receiving an identifier of the first USIM and an identifier of the second USIM with the indication of the downlink data notification from the first network.

When the first network and the second network comprise visited networks, the apparatus may be caused to perform receiving the indication of the downlink data notification from a home network associated with the user equipment.

The apparatus may be caused to perform providing a response to the indication of downlink data notification from the second network to the first network via the home network associated with the user equipment.

In a seventeenth aspect there is provided a non-transitory computer readable medium comprising program instructions for causing an apparatus to perform at least the method according to the third aspect or a method according to the fourth aspect.

In the above, many different embodiments have been described. It should be appreciated that further embodiments may be provided by the combination of any two or more of the embodiments described above.

DESCRIPTION OF FIGURES

Embodiments will now be described, by way of example only, with reference to the accompanying Figures in which:

FIG. 4 shows a flowchart of a method according to an example embodiment;

FIG. 5 shows a flowchart of a method according to an example embodiment;

FIG. 6 shows a flowchart of a method according to an example embodiment;

DETAILED DESCRIPTION

Before explaining in detail the examples, certain general principles of a wireless communication system and mobile communication devices are briefly explained with reference to FIGS. 1 to 3 to assist in understanding the technology underlying the described examples.

An example of a suitable communications system is the 5G System (5GS). Network architecture in 5GS may be similar to that of LTE-advanced. Base stations of NR systems may be known as next generation Node Bs (gNBs). Changes to the network architecture may depend on the need to support various radio technologies and finer QoS support, and some on-demand requirements for e.g. QoS levels to support QoE of user point of view. Also network aware services and applications, and service and application aware networks may bring changes to the architecture. Those are related to Information Centric Network (ICN) and User-Centric Content Delivery Network (UC-CDN) approaches. NR may use multiple input-multiple output (MIMO) antennas, many more base stations or nodes than the LTE (a so-called small cell concept), including macro sites operating in co-operation with smaller stations and perhaps also employing a variety of radio technologies for better coverage and enhanced data rates.

Future networks may utilise network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations to be carried out, at least partly, in a server, host or node operationally coupled to a remote radio head. It is also possible that node operations will be distributed among a plurality of servers, nodes or hosts. It should also be understood that the distribution of labour between core network operations and base station operations may differ from that of the LTE or even be non-existent.

Figure 1:
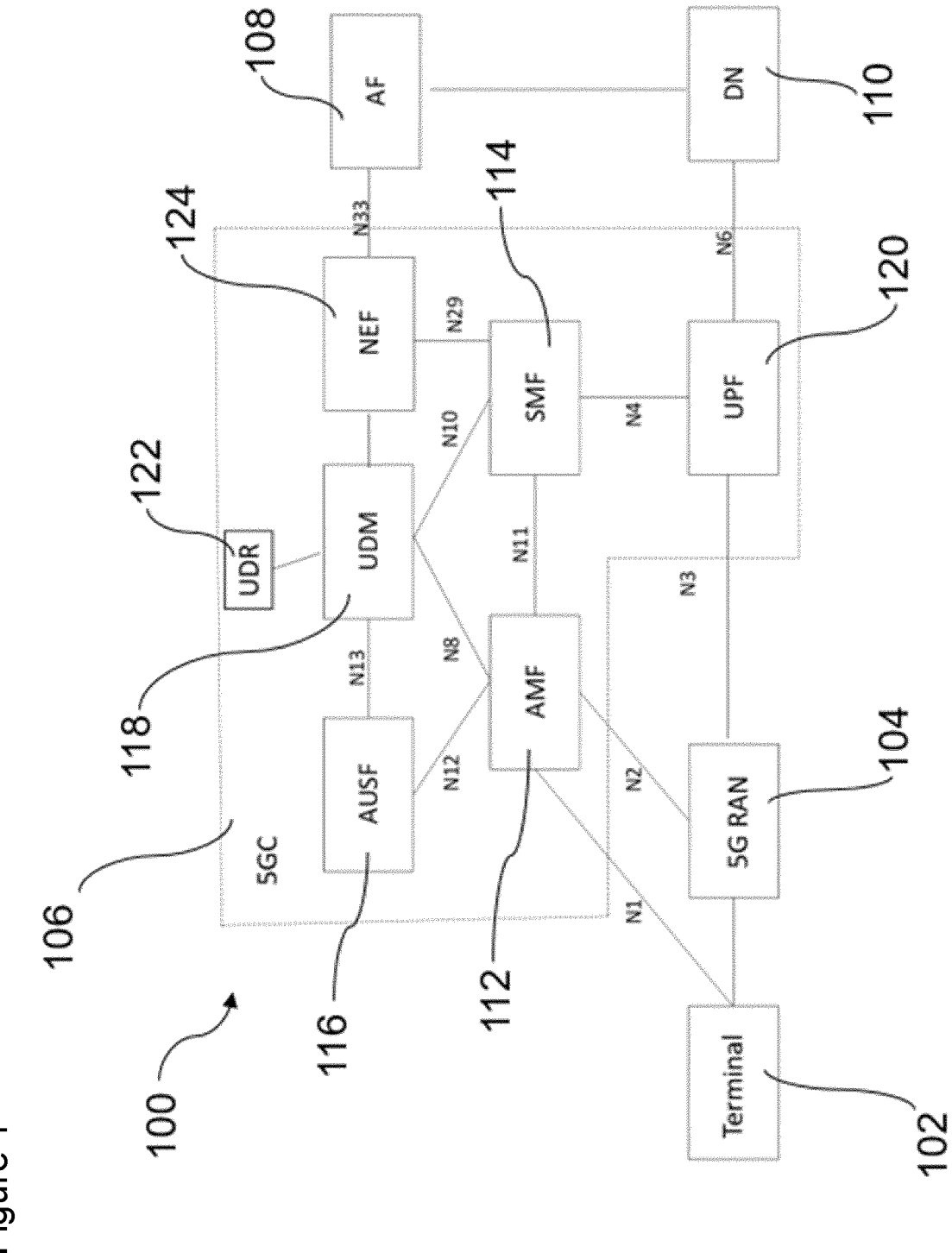
FIG. 1 shows a schematic diagram of an example communication system comprising a base station and a plurality of communication devices.

FIG. 1 shows a schematic representation of a 5G system (5GS) 100. The 5GS may comprise a user equipment (UE) 102 (which may also be referred to as a communication device or a terminal), a 5G radio access network (5GRAN) 104, a 5G core network (5GCN) 106, one or more application functions (AF) 108 and one or more data networks (DN) 110.

An example 5G core network (CN) comprises functional entities. The 5GCN 106 may comprise one or more access and mobility management functions (AMF) 112, one or more session management functions (SMF) 114, an authentication server function (AUSF) 116, a unified data management (UDM) 118, one or more user plane functions (UPF) 120, a unified data repository (UDR) 122 and/or a network exposure function (NEF) 124. The UPF is controlled by the SMF (Session Management Function) that receives policies from a PCF (Policy Control Function).

The CN is connected to a UE via the radio access network (RAN). The 5GRAN may comprise one or more gNodeB (GNB) distributed unit functions connected to one or more gNodeB (GNB) centralized unit functions. The RAN may comprise one or more access nodes.

An UPF (User Plane Function) whose role is called PSA (PDU Session Anchor) may be responsible for forwarding frames back and forth between the DN (data network) and the tunnels established over the 5G towards the UE(s) exchanging traffic with the DN.

Figure 2:
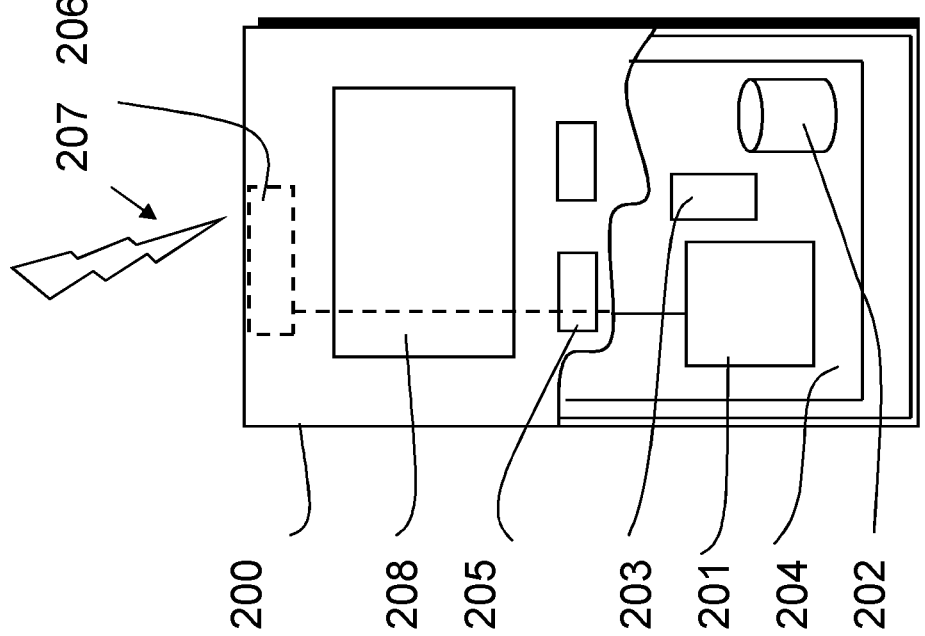
FIG. 2 shows a schematic diagram of an example mobile communication device.

A possible mobile communication device will now be described in more detail with reference to FIG. 2 showing a schematic, partially sectioned view of a communication device 200. Such a communication device is often referred to as user equipment (UE) or terminal. An appropriate mobile communication device may be provided by any device capable of sending and receiving radio signals. Non-limiting examples comprise a mobile station (MS) or mobile device such as a mobile phone or what is known as a 'smart phone', a computer provided with a wireless interface card or other wireless interface facility (e.g., USB dongle), personal data assistant (PDA) or a tablet provided with wireless communication capabilities, or any combinations of these or the like. A mobile communication device may provide, for example, communication of data for carrying communications such as voice, electronic mail (email), text message, multimedia and so on. Users may thus be offered and provided numerous services via their communication devices. Non-limiting examples of these services comprise two-way or multi-way calls, data communication or multimedia services or simply an access to a data communications network system, such as the Internet. Users may also be provided broadcast or multicast data. Non-limiting examples of the content comprise downloads, television and radio programs, videos, advertisements, various alerts and other information.

A mobile device is typically provided with at least one data processing entity 201, at least one memory 202 and other possible components 203 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 204. The user may control the operation of the mobile device by means of a suitable user interface such as key pad 205, voice commands, touch sensitive screen or pad, combinations thereof or the like. A display 208, a speaker and a microphone can be also provided. Furthermore, a mobile communication device may comprise appropriate connectors (either wired or wireless) to other devices and/or for connecting external accessories, for example hands-free equipment, thereto.

The mobile device 200 may receive signals over an air or radio interface 207 via appropriate apparatus for receiving and may transmit signals via appropriate apparatus for transmitting radio signals. In FIG. 2 transceiver apparatus is designated schematically by block 206. The transceiver apparatus 206 may be provided for example by means of a radio part and associated antenna arrangement. The antenna arrangement may be arranged internally or externally to the mobile device.

Figure 3:
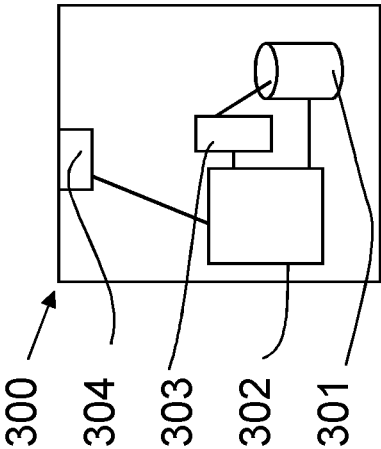
FIG. 3 shows a schematic diagram of an example control apparatus.

FIG. 3 shows an example embodiment of a control apparatus for a communication system, for example to be coupled to and/or for controlling a station of an access system, such as a RAN node, e.g. a base station, eNB or gNB, a relay node or a core network function such as AMF/SMF, or a server or host. The method may be implanted in a single control apparatus or across more than one control apparatus. The control apparatus may be integrated with or external to a node or module of a core network or RAN. In some embodiments, base stations comprise a separate control apparatus unit or module. In other embodiments, the control apparatus can be another network element such as a radio network controller or a spectrum controller. In some embodiments, each base station may have such a control apparatus as well as a control apparatus being provided in a radio network controller. The control apparatus 300 can be arranged to provide control on communications in the service area of the system. The control apparatus 300 comprises at least one memory 301, at least one data processing unit 302, 303 and an input/output interface 304. Via the interface the control apparatus can be coupled to a receiver and a transmitter of the base station. The receiver and/or the transmitter may be implemented as a radio front end or a remote radio head.

The following is related to Network Slicing in 5G mobile network and UE access to subscribed slices provided by different visited PLMNs (VPLMNs)c in roaming scenarios.

TS 23.501, section 5.15.6 describes Network slice selection during Roaming.

If the VPLMN and Home PLMN (HPLMN) have a service level agreement (SLA) to support non-standard S-NSSAI values in the VPLMN, the NSSF of the VPLMN maps the Subscribed Single-Network Slice Selection Assistance Information (S-NSSAI) values to the respective S-NSSAI values to be used in the VPLMN. The S-NSSAI values to be used in the VPLMN are determined by the Network Slice Selection Function (NSSF) of the VPLMN based on the SLA. The NSSF of the VPLMN need not inform the HPLMN of which values are used in the VPLMN. Depending on operator's policy and the configuration in the AMF, the AMF may decide the S-NSSAI values to be used in the VPLMN and the mapping to the Subscribed S-NSSAIs.

The UE constructs Requested NSSAI and provides the mapping of S-NSSAIs of the Requested NSSAI to HPLMN S-NSSAIs if the mapping is stored in the UE, as described in clause 5.15.5.2.1 of TS 23.501.

The NSSF in the VPLMN determines the Allowed NSSAI without interacting with the HPLMN.

The Allowed NSSAI in the Registration Accept includes S-NSSAI values used in the VPLMN. The mapping information described above is also provided to the UE with the Allowed NSSAI as described in clause 5.15.4 of TS 23.501.

In PDU Session Establishment procedure, the UE includes both:

(a) the S-NSSAI that matches the application (that is triggering the Packet Data Unit (PDU) Session Request) within the NSSP in the URSP rules or within the UE Local Configuration as defined in clause 6.1.2.2.1 of TS 23.503 [45]; the value of this S NSSAI is used in the HPLMN; and (b) an S-NSSAI belonging to the Allowed NSSAI that maps to (a) using the mapping of the Allowed NSSAI to HPLMN S-NSSAIs; the value of this S-NSSAI is used in the VPLMN.

TS 23.502-5G; Procedures for the 5G system states that during the registration the Home Network can provide Steering of Roaming information to the UE via the AMF (i.e. a list of preferred PLMN/access technology combinations or HPLMN indication that 'no change of the "Operator Controlled PLMN Selector with Access Technology" list stored in the UE is needed). The Home Network can include an indication for the UE to send an acknowledgement of the reception of this information.

TS 23.122-Architectural requirements defines:

If the MS receives a USAT REFRESH command qualifier (3GPP TS 31.111 [41]) of type "Steering of Roaming", the MS shall:

a) replace the highest priority entries in the "Operator Controlled PLMN Selector with Access Technology" list stored in the ME with the list provided in the REFRESH command;

b) delete the PLMNs identified by the list in the REFRESH command from the Forbidden PLMN list and from the Forbidden PLMNs for General Packet radio Service (GPRS) service list, if they are present in these lists. This includes any information stored in the Subscriber Identity Module (SIM) and the ME internal memory;

TS 23.122 describes Network selection in VPLMN:

If the MS is in a VPLMN, the MS shall periodically attempt to obtain service on its HPLMN (if the Equivalent Home PLMN (EHPLMN) list is not present or is empty) or one of its EHPLMNs (if the EHPLMN list is present) or a higher priority PLMN/access technology combinations listed in "user controlled PLMN selector" or "operator controlled PLMN selector" by scanning in accordance with the requirements that are applicable in the order:

i) either the HPLMN (if the EHPLMN list is not present or is empty) or the highest priority EHPLMN that is available (if the EHPLMN list is present);

ii) each PLMN/access technology combination in the "User Controlled PLMN Selector with Access Technology" data file in the SIM (in priority order);

iii) each PLMN/access technology combination in the "Operator Controlled PLMN Selector with Access Technology" data file in the SIM (in priority order) or stored in the ME (in priority order);

A roaming UE may have subscriptions to multiple slices available in a visited area but not all slices are offered by a single network in that area.

Based on a roaming agreement between HPLMN and VPLMNs, different operators may provide services to the UE for subscribed network slices. This may result in a situation where a UE needs to access multiple VPLMNs to access mutually exclusive network slices. It has been proposed that a UE can trigger multiple registration procedures with different VPLMN based on subscribed S-NSSAI and VPLMN mapping information in the roaming area (e.g., register on the preferred VPLMN and any other VPLMN providing subscribed network slices not available in the preferred VPLMN).

The UE may maintain multiple registrations in VPLMNs independently.

While a UE is using one application via a network slice from one operator, the UE may not be able to receive downlink data notifications from other applications via another network slice from the other operator.

For a multi-Universal Subscriber Identity Modules (MUSIM) device, where one USIM is registered with one PLMN and the other USIM is registered with a different PLMN, with a single RX/TX, the device will be able to listen to one PLMN at a time, how a network handles MT data or MT control-plane activity occurring when Multi-USIM device has left is being considered.

FIG. 4 shows a flowchart of a method according to an example embodiment. The method may be performed at a user equipment.

In a first step, S1, the method comprises at a user equipment registered with a first network and a second network, accessing the second network.

In a second step, S2, the method comprises receiving at the user equipment from the second network a downlink data notification associated with the first network.

FIG. 5 shows a flowchart of a method according to an example embodiment. The method may be performed at an AMF of the first network.

In a first step, T1, the method comprises determining at a first network, a downlink data notification for a user equipment registered with the first network and a second network, wherein the user equipment is not accessing the first network.

In a second step, T2, the method comprises providing an indication of the downlink data notification from the first network to the second network for forwarding to the user equipment.

FIG. 6 shows a flowchart of a method according to an example embodiment. The method may be performed at a UDM of a home network associated with the user equipment or the second network.

In a first step, U1, the method comprises receiving, from a first network at a management node, an indication of a downlink data notification for a user equipment registered with the first network and a second network, wherein the user equipment is not accessing the first network and is accessing the second network.

In a second step, U2, the method comprises providing the indication of the downlink data notification to the user equipment via the second network.

Figure 7:
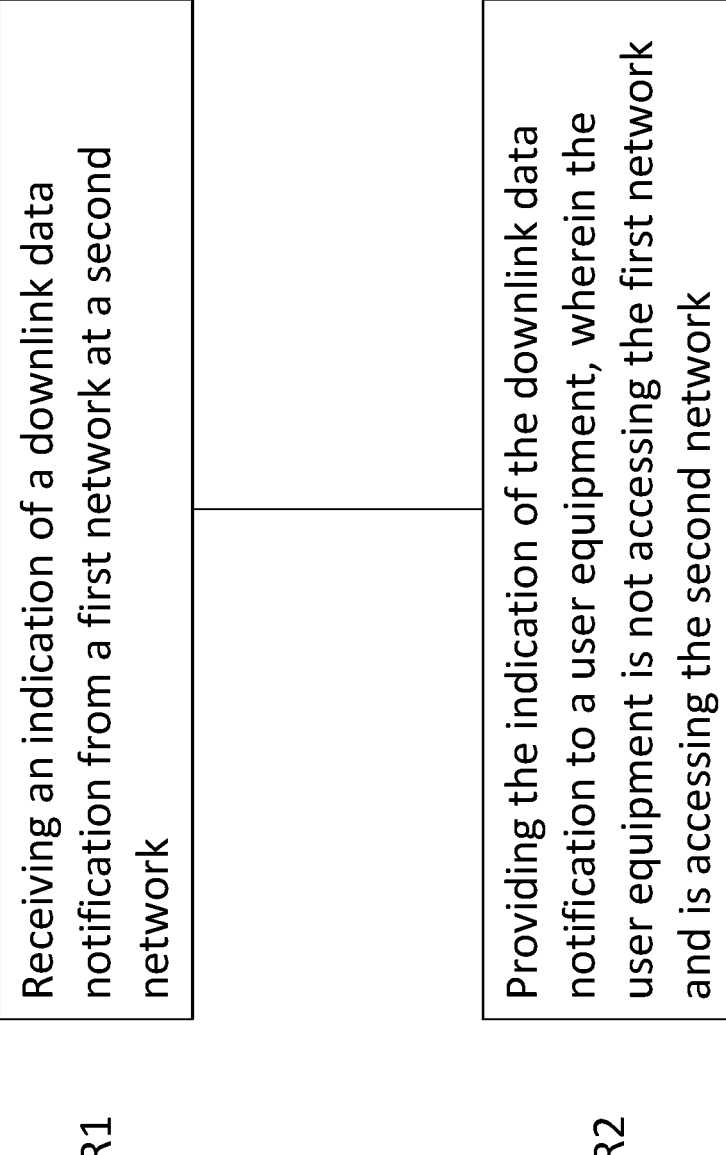
FIG. 7 shows a flowchart of a method according to an example embodiment.

FIG. 7 shows an apparatus according to an example embodiment. The method may be performed at the AMF of the second network.

In a first step, R1, the method may comprise receiving an indication of a downlink data notification from a first network at a second network.

In a second step, R2, the method may comprise providing the indication of the downlink data notification to a user equipment, wherein the user equipment is not accessing the first network and is accessing the second network.

When the UE is not accessing the network it may be set to MICO mode or an Inactive state.

The method may comprise receiving the downlink data notification at the user equipment in a configuration update request from the second network when the user equipment is in connected mode or in a paging message when the user equipment is in idle mode.

The method may comprise providing a response to the configuration update request from the user equipment to the second network with either an indication either that the user equipment is moving to the first network, the indication comprising buffer time details, or a rejection of the configuration update request.

The method may comprise providing an indication from the user equipment to the second network that the user equipment is moving to an inactive state and performing a service request procedure with the first network. The method may comprise providing an indication to the second network that the user equipment is in MICO mode in a registration update procedure.

The first network may be a first visited network and the second network may be a second visited network. That is, the UE may be a roaming UE. The method may comprise providing the indication of the downlink data notification to the second network from the first network via a home network (e.g., HPLMN) associated with the user equipment. The method may comprise receiving a response to the indication of the downlink data notification at the first network from the second network via the home network. The indication of the downlink data notification, or the response, may be provided via a UDM of a HPLMN.

The method may comprise providing an indication that the user equipment supports registration with more than one network to the first network and the second network during a registration procedure with the respective network. For example, the UE may indicate a flag for "support of multiple registration" to the AMF of a network during registration with that network.

The UDM of the home network subscribes with the AMF of the visited networks for pending downlink data notification for the UE. (for example—Nudm_SDM_Info service operation can be enhanced for this purpose).

Similarly, an AMF of a visited network subscribes with UDM of a home network for downlink data notification from other VPLMN for the UE. (for example—Nudm_SDM_Notification service operation can be enhanced for this purpose).

When the UE determines it needs to be reachable through a specific PLMN, the UE performs a registration update procedure and sets UE to MICO mode in the other PLMNs.

When a downlink data notification is received for the UE which is in MICO mode, and AMF has cleared the PPF flag. AMF notifies UE's HPLMN UDM about the pending downlink data notification.

UDM would be aware of the network, where the UE is currently Active (last registration received. The UE may be registered in more than two networks. When the user equipment is active in more than one second network, the method may comprise determining the second network via which to send the indication of the downlink data notification based on a preference received from the user equipment or the most recently updated second network. For example, In case of the UE supporting dual RX/TX, UDM may have details of two networks where the UE is concurrently active, or the UE may indicate in registration a preference to receive paging notification in the current PLMN, which then is reported to the UDM.

UDM would forward the paging notification (along with the originating network details) for the UE to the AMF of the current active network/network selected for Paging notification. (In case of multiple network showing Active state for the UE, UDM would prioritize based on latest updated one or based on a preference indicated by the UE.)

Once the AMF receives the notification from the UDM, it will forward the notification to the UE using UE configuration update procedure UE, after receiving the paging notification/downlink data notification along with the originated network details, may send an acknowledge of the reception in UE configuration update response or and may optionally also indicate the UE action (will move to originating network or not and related timer details for buffering the data in case UE is moving back.)

The method may comprise receiving a response to the indication of the downlink data notification from the user equipment via the second network. The response may be an indication of failure and, if the user equipment is active in more than one second network the method may comprise determining a further second network via which to provide the indication of the downlink data notification to the user equipment. That is, if there is no response from the UE, based on a local timer, the AMF may send a failure indication to the UDM in the acknowledgement. If the UDM has multiple AMF/network showing active for the UE, then the UDM may send the notification to the other AMF/network based on the priority list).

The method may comprise providing the response to the first network from the home network. In an example embodiment, based on UE's acknowledgment details, the UDM will send the acknowledgement to the AMF of the originating network.

The first network may provide the response to the indication of the downlink data notification to a session management function. For example, based on the acknowledgment details, the AMF will indicate to the SMF, which either starts a timer for buffering or send failure notification to the UPF.

The UE which decides to move back to originating network (from which the paging notification was received) would trigger registration update procedure (with type mobility registration update and also update the MICO mode) with the current network.

UE triggers a service request procedure with the originating network, which is expecting the UE to connect back based on notification acknowledgement from the HPLMN UDM of the UE. AMF of the originating network would set the PPF flag and start active timer for the UE.

Figure 8:
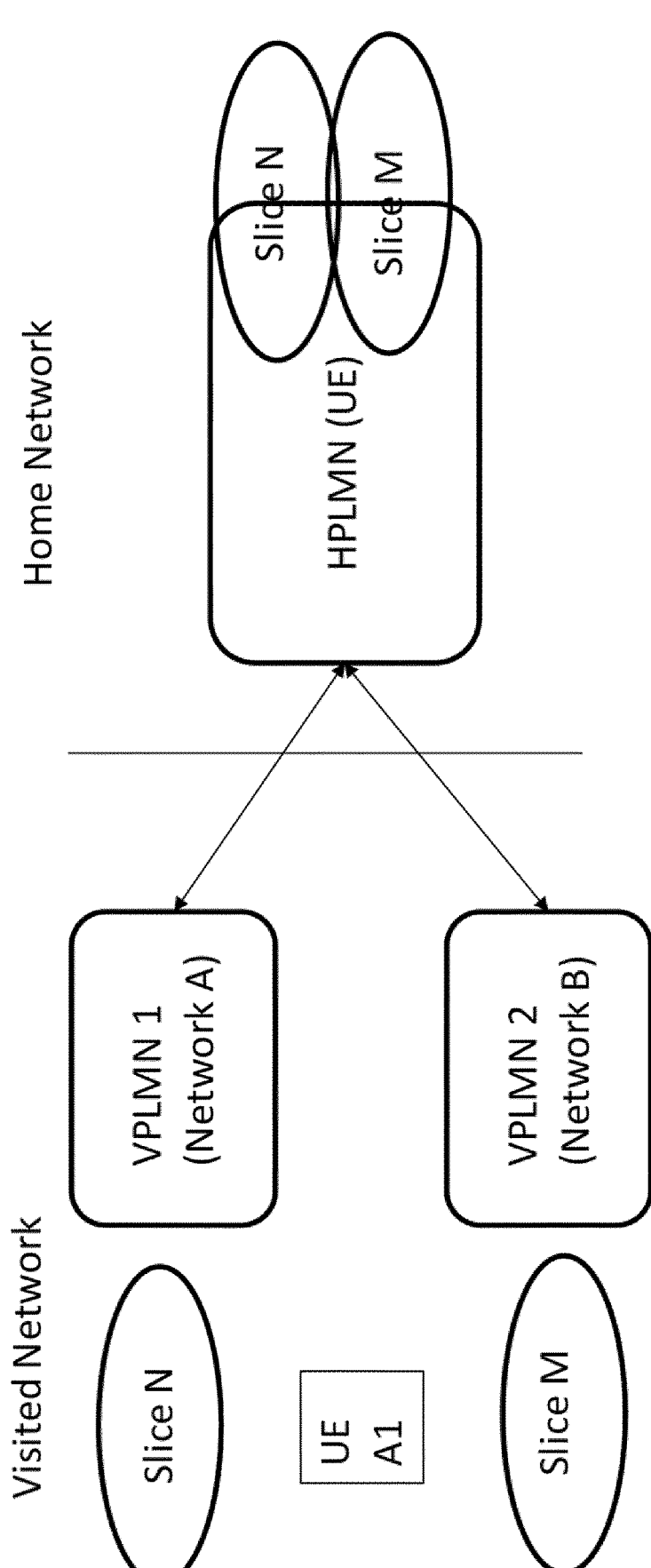
FIG. 8 shows a schematic diagram of a UE having a subscription to slices M and N in a visited Network.

FIG. 8 shows a deployment scenario for a first example embodiment where a roaming UE has subscriptions to multiple slices. Not all slices which are subscribed in home network are offered by a single network in roaming area.

In the scenario shown in FIG. 8, a UE is roaming having subscriptions to slice N and M (or equivalent) in HPLMN. In the visited area, slice N and slice M are provided by different network operators (VPLMNs), denoted by Network A and Network B respectively.

As part of network roaming agreements, Network A is the preferred partner for HPLMN in the visited area. Different applications in UE, for example x and y require slice M and N respectively to meet their SLA.

Figure 9:
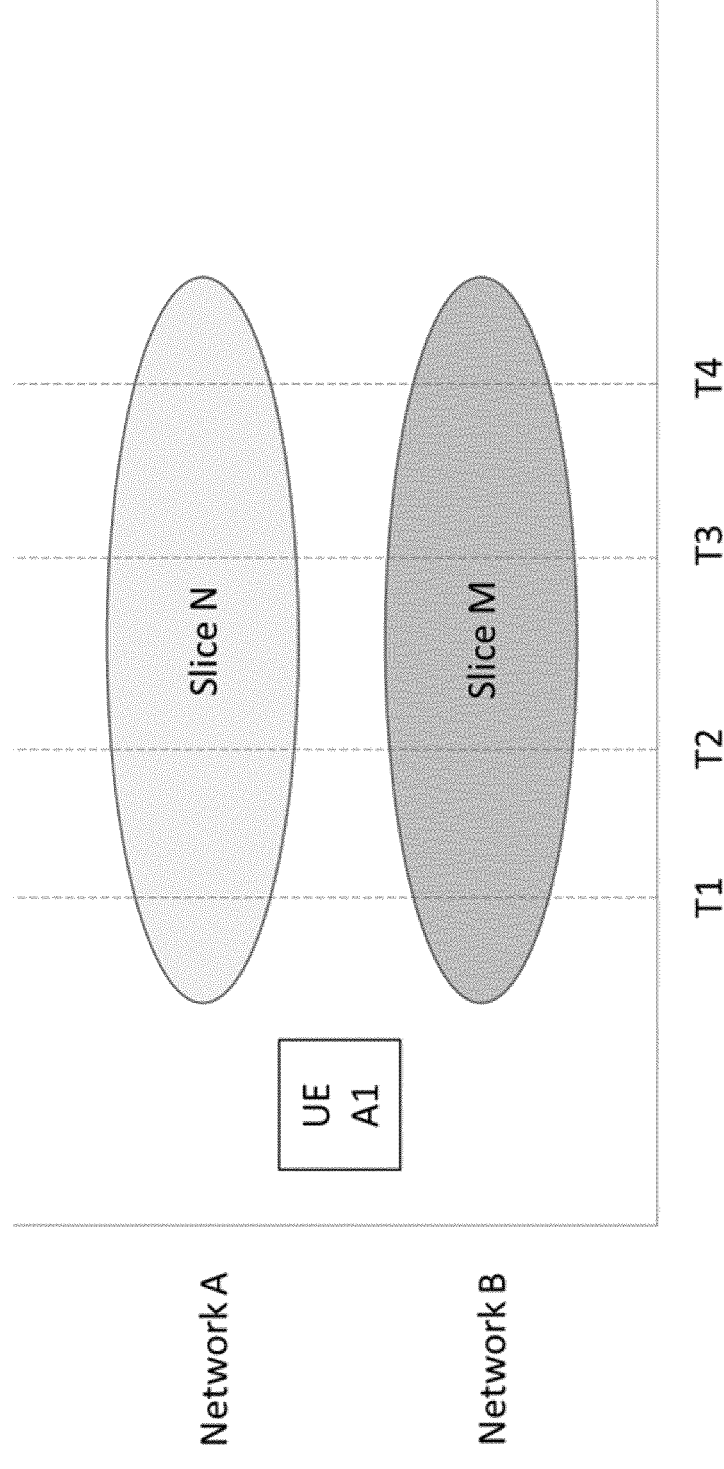
FIG. 9 shows a usage against time of a Slice N provided by Network A and a slice M provided by Network B.

FIG. 9 shows the usage of the slice N and slice M provided by Networks A and B, respectively, against time.

Figure 10:
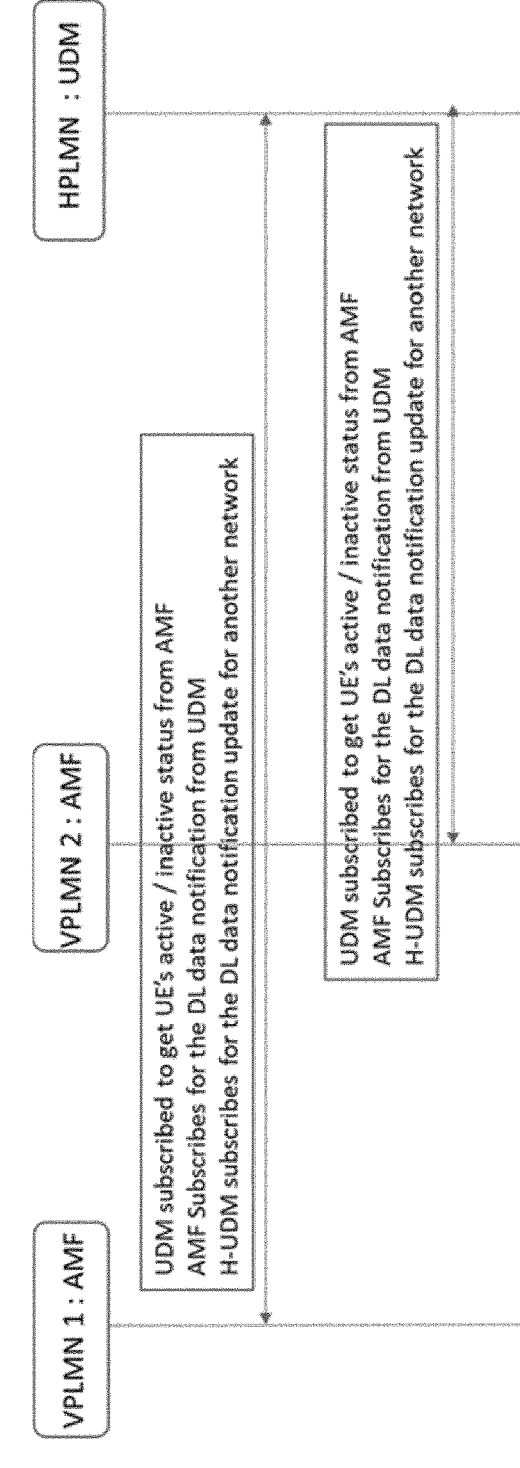
FIG. 10 shows a signalling flow according to an example embodiment.

FIG. 10 shows a signalling flow according to an example embodiment. In this example embodiment, the UDM of the HPLMN has subscribed with AMF of Network A and the AMF of Network B for regular updates regarding UE's state (Active/Inactive).

The AMF of Network A and the AMF of Network B has subscribed with UDM of the HPLMN for DL data notification update.

The UDM of the HMPLN has subscribed with the AMF of Network A and the AMF of Network B for DL data notification update to another network.

The subscriptions at AMFs and H-UDM may be realized with an enhancement to existing 3GPP UDM and AMF subscribe service operations (e.g. Nudm_SDM_Subscribe).

Figure 11:
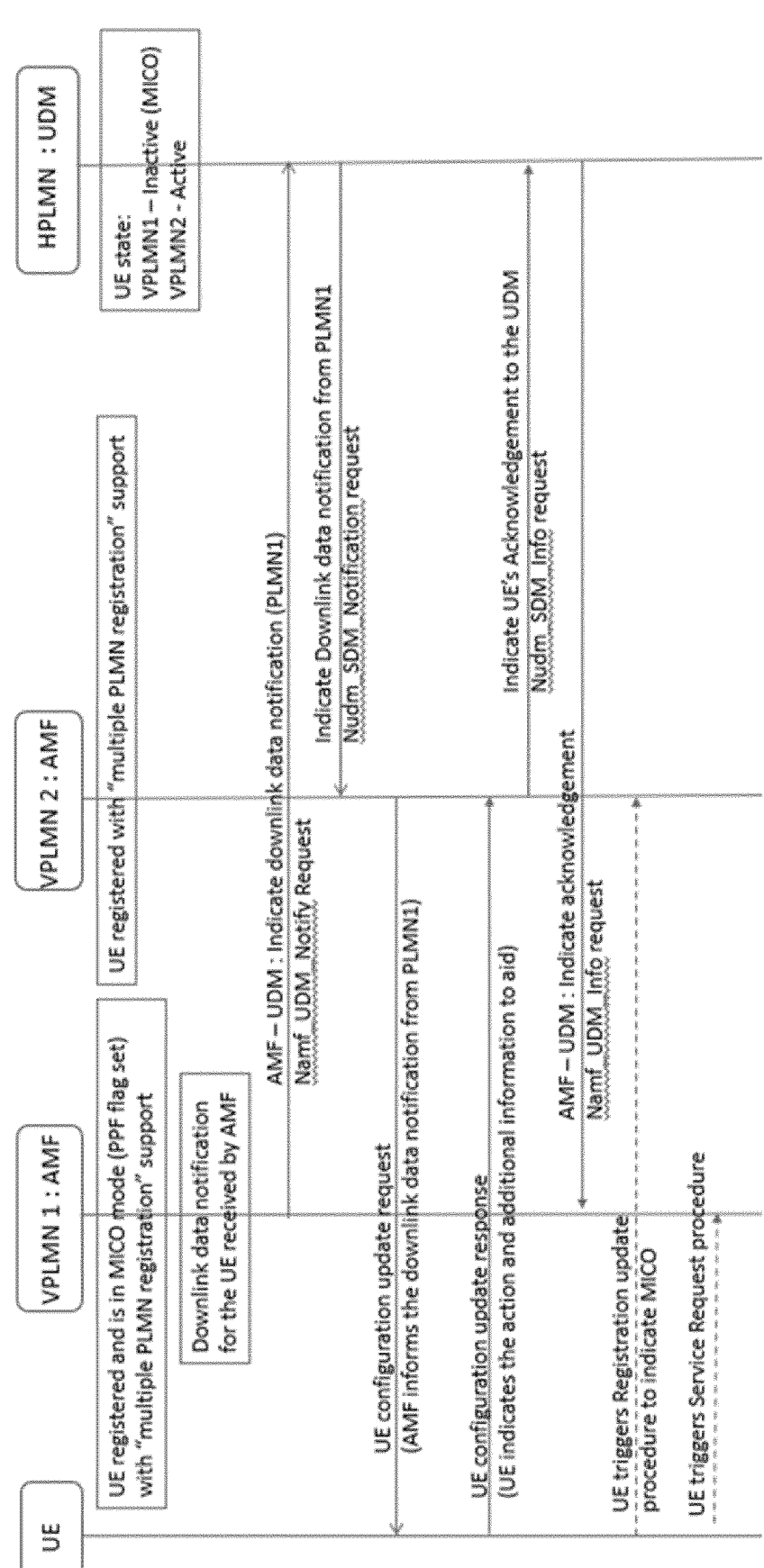
FIG. 11 shows a signalling flow according to an example embodiment.

FIG. 11 shows a signalling flow according to an example embodiment.

Initially at time T1, UE A1 accesses Network A and makes use of application app1 using slice N.

The AMF of Network A indicates that the UE is active in its network to UDM (HPLMN of UE) based on subscription/notification from/to UDM regarding UE's active state.

The AMF of Network B indicates that the UE is in MICO mode in its network to UDM (HPLMN of UE) based on subscription/notification from/to UDM regarding UE's state.

At time T2, UE A1 needs to access application app2 that requires slice M from Network B. The AMF of Network B indicates that the UE is active in its network to UDM (HPLMN of the UE) based on subscription/notification from/to UDM regarding UE's active state.

The AMF of Network A indicates that the UE is in MICO mode in its network to UDM (HPLMN of the UE) based on subscription/notification from/to UDM regarding UE's state.

At time T3, when the UE A1 is accessing Network B, Network A gets downlink data notification from application app1 in slice N for UE A1.

Since UE is in MICO mode, AMF has cleared PPF flag for the UE and also AMF knows that the UE "supports multiple registration", AMF sends paging notification (with its network details) to the UDM (HPLMN of the UE).

UDM after receiving the notification, determines in which network (AMF), the UE state is active. In this example, its Network B.

The UDM sends the paging notification, along with Network A details, to the AMF of Network B.

The AMF of Network B sends the notification through UE configuration update procedure. UE would send an acknowledgement (optionally with details related to its action—like connecting to Network A or not).

AMF (Network B) would send the acknowledgement to the UDM.

UDM sends the acknowledgement to the AMF (of Network A), which takes appropriate action (either buffer the data and await UE triggered service request procedure or indicate failure to the UPF).

At time T4, when the UE A1 is accessing Network A, Network B gets downlink data notification from application app2 in slice M for UE A1.

The steps above are repeated, only instead of Network A, AMF of Network B indicates the paging notification to UDM (HPLMN of the UE) and AMF of Network A will indicate the paging notification to the UE through UE configuration update procedure.

The UE may have a first Universal Subscriber Identity Module registered with the first network and a second Universal Subscriber Identity Module registered with the second network. For the MUSIM case with a single TX/RX it is assumed that both USIMs either belong to the same PLMN or, if they belong to different PLMNs, both PLMNs have an agreement to support the data notification feature. The method may comprise providing an identifier of the second USIM to the first network during registration of the first USIM and providing an identifier of the first USIM to the second network during registration of the second USIM. The identifier of the USIM may be SUCI. The user equipment may have a plurality of second USIMs, each USIM registered with one of a plurality of second networks. The method may comprise providing an indication to the first network of which of the plurality of second networks is the active network.

Figure 12:
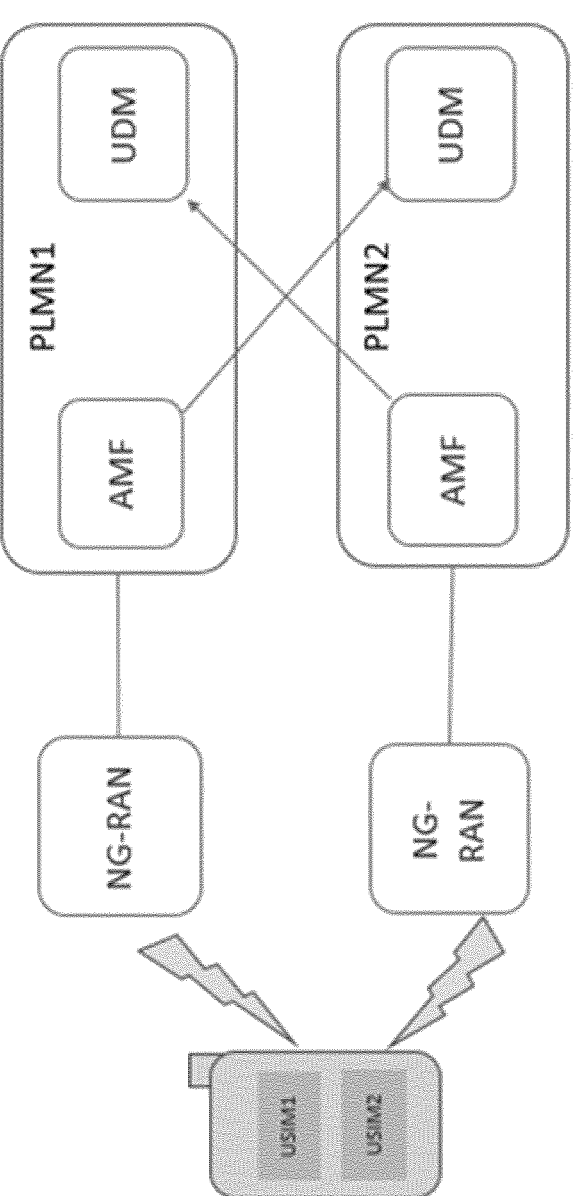
FIG. 12 shows a schematic diagram of a MUSIM device.

FIG. 12 shows a schematic diagram of a MUSIM device. The MUSIM device is a single TX/RX capable device with two USIMs. In this example embodiment, USIM1 is registered with PLMN1 and USIM2 is registered with PLMN2.

MUSIM device will indicate both SUCI1 (USIM1), SUCI2 (USIM2) (or list of SUCI's if there is more than one second USIM) while registering with AMF1/PLMN1 (USIM1) and also indicate if downlink data notification has to be informed through other PLMN by setting a flag, when UE is in MICO mode in the PLMN.

To cause the AMF to forward paging notification to the other PLMN. UE could indicate its changing to MICO mode to the network through registration procedure and support of "DL indication through another PLMN support"

The method may comprise receiving the indication of downlink data notification at the first network from a management node of the first network (e.g., UDM1) or the second network (UDM2). When the user equipment is registered with a plurality of second networks the method may comprise determining which of the plurality of second networks is a current active network to forward the indication of downlink data notification for the user equipment. The method may comprise determining a management node of the second network or the active network based on the identifier of the second USIM and providing the indication of the downlink data notification for the user equipment to the management node of the active network. The method may comprise receiving a response to the indication of downlink data notification from the management node of the active network. The AMF of the second network may provide the response to the management node of the second network. When the user equipment has more than one second USIM, each second USIM registered with one of a plurality of second networks, the method may comprise receiving from the user equipment an indication of which of the plurality of second networks is the active network and determining the management node based on the indication and the identifier of the USIM of the active network.

The indication of the downlink notification may comprise at least one of first network information, an identifier of the first USIM and an identifier of the second USIM.

The method may comprise validating the received identifiers and indicating the downlink data notification for the first USIM to the user equipment.

For example, when MUSIM device is accessing PLMN2 (USIM2), and downlink data otification is received by AMF1/PLMN1 (USIM1), then AMF1 will notify UDM2 (PLMN2/USIM2) based on discovery of UDM2 using SUCI2 id, and indicate both SUCI1, SUCI2 information, indicating DL data for SUCI1.

UDM2 discovers AMF2 based on SUCI2 update details in its database and notify DL data notification (for SUCH from PLMN1) to AMF2 based on earlier subscription by the AMF2, which further notifies the UE using UE configuration update procedure.

UE after receiving the paging notification/downlink data notification along with the originated network details, will send an acknowledge of the reception and may optionally also indicate the UE action (will move to originating network or not and related timer details for buffering the data in case UE is moving back.)

Based on UE's acknowledgment details, the UDM2 will send the acknowledgement to the AMF1 of the originating network (PLMN1/USIM1).

Based on the acknowledgment details, the AMF will indicate to the SMF, which either starts a timer for buffering or send failure notification to the UPF.

UE would trigger UE triggered service request procedure with the PLMN1.

Alternatively, NEF can be used as mediator during interaction between AMF of one network (PLMN) and UDM of the other network (PLMN).

Figure 13:
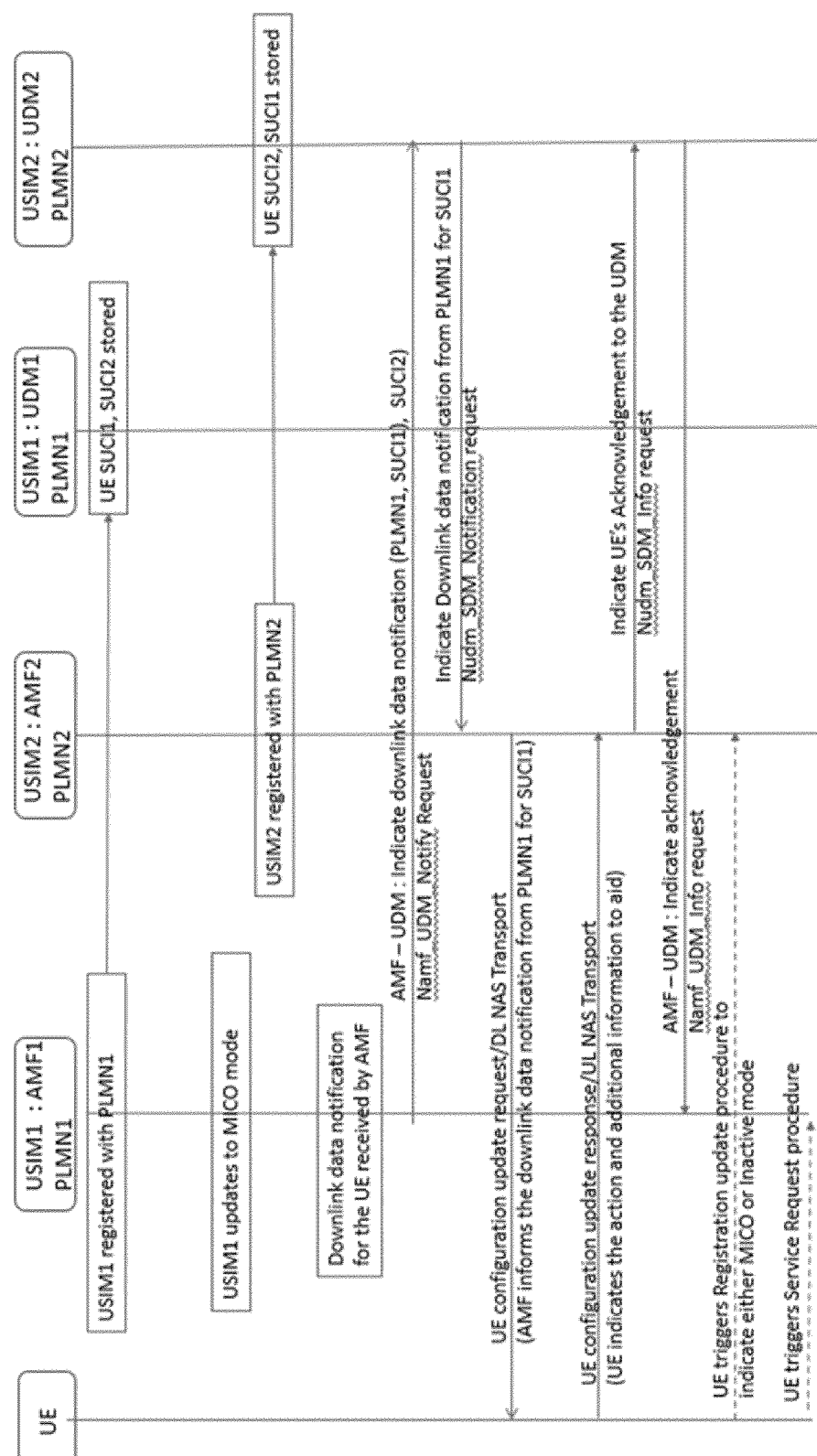
FIG. 13 shows a signalling flow according to an example embodiment.

FIG. 13 shows a signalling flow according to an example embodiment.

UE indicates if it's moving to MICO and also set a flag "indicate DL data notification through other PLMN" during registration with PLMN.

When the UE is in MICO mode, the AMF, when it receives a downlink data notification will notify the UDM based on discovery using SUCI2 and indicate that there is downlink data notification for SUCI1 in PLMN1.

The UDM2 from PLMN2 will send the notification to AMF of PLMN2 based on earlier subscription by the AMF. And AMF sends the notification via UE configuration update request procedure to the UE.

UE would send an acknowledgement in the response, along with the action decided by the UE with additional information to aid the action. (for example, UE connecting back to PLMN1 via service request procedure or discard the downlink data).

The method enables DL data notification so that a UE does not miss data/traffic from one slice or operator while the UE is connected to another network.

The method may be implemented in a control apparatus as described with reference to FIG. 3.

An apparatus may comprise means for, at a user equipment registered with a first network and a second network, accessing the second network and receiving at the user equipment from the second network a downlink data notification associated with the first network.

An apparatus may comprise means for determining at a first network, a downlink data notification for a user equipment registered with the first network and a second network, wherein the user equipment is not accessing the first network and providing an indication of the downlink data notification from the first network to the second network for forwarding to the user equipment.

An apparatus may comprise means for receiving, from a first network at a management node, an indication of a downlink data notification for a user equipment registered with the first network and a second network, wherein the user equipment is not accessing the first network and is accessing the second network and providing the indication of downlink data notification to the user equipment via the second network.

An apparatus may comprise means for receiving an indication of a downlink data notification from a first network at a second network and providing the indication of the downlink data notification to a user equipment, wherein the user equipment is not accessing the first network and is accessing the second network.

It should be understood that the apparatuses may comprise or be coupled to other units or modules etc., such as radio parts or radio heads, used in or for transmission and/or reception. Although the apparatuses have been described as one entity, different modules and memory may be implemented in one or more physical or logical entities.

It is noted that whilst embodiments have been described in relation to LTE and 5GS, similar principles can be applied in relation to other networks and communication systems. Therefore, although certain embodiments were described above by way of example with reference to certain example architectures for wireless networks, technologies and standards, embodiments may be applied to any other suitable forms of communication systems than those illustrated and described herein.

It is also noted herein that while the above describes example embodiments, there are several variations and modifications which may be made to the disclosed solution without departing from the scope of the present invention.

In general, the various example embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Computer software or program, also called program product, including software routines, applets and/or macros, may be stored in any apparatus-readable data storage medium and they comprise program instructions to perform particular tasks. A computer program product may comprise one or more computer-executable components which, when the program is run, are configured to carry out embodiments. The one or more computer-executable components may be at least one software code or portions of it.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD. The physical media is a non-transitory media.

The memory may be of any type suitable to the local technical environment and may be implemented using any suitable data storage technology, such as semiconductor based memory devices, magnetic memory devices and systems, optical memory devices and systems, fixed memory and removable memory. The data processors may be of any type suitable to the local technical environment, and may comprise one or more of general purpose computers, special purpose computers, microprocessors, digital signal processors (DSPs), application specific integrated circuits (ASIC), FPGA, gate level circuits and processors based on multi core processor architecture, as non-limiting examples.

Example embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The foregoing description has provided by way of non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims. Indeed, there is a further embodiment comprising a combination of one or more embodiments with any of the other embodiments previously discussed.

The inventon claimed is:

1. A user equipment (UE) comprising:
   a first universal subscriber identity module (USIM) registered with a first network;
   a second USIM registered with a second network;
   at least one processor; and
   at least one memory including a computer program code, the at least one memory and computer program code configured to, with the at least one processor, cause the UE at least to:
   register with the first network,
       wherein an identifier of the second USIM is provided to the first network when the UE is registering with the first network, the identifier of the second USIM comprising a Subscriber Concealed Identifier (SUCI) of the second USIM,
       wherein the UE is in a mobile initiated connection only mode for the first network and an access and mobility management function (AMF) of the first network clears a paging proceed flag (PPF);
   register with the second network,
       wherein an identifier of the first USIM is provided to the second network when the UE is registering with the second network, the identifier of the first SIM comprising a SUCI of the first USIM;
       provide a first indication that the UE supports registration with more than one network to the first network and the second network during a registration proce-
dure with the respective network;
access the second network;
receive, from the second network, a downlink data noti-
fication associated with the first network and first
network information,
wherein the downlink data notification is forwarded
from the first network to the second network via a
home public land mobile network (HPLMN),
wherein the downlink data notification associated with
the first network is received in a configuration update
request sent by the second network when the UE is
in
a connected mode;
provide a response to the configuration update request to
the second network, the response comprising an indi-
cation that the UE is moving to the first network and
buffer time details,
wherein the response to the configuration update
request is forwarded from the second network to a
session management function of the first network via
the HPLMN, wherein the session management func-
tion causes a timer for buffering to start;
during a registration update procedure, provide a second
indication to the second network that the UE is in a
mobile initiated communication only mode; and
perform a service request procedure to request a service
provided by the first network.

* * * * *